(12) United States Patent
Shakudo et al.

(10) Patent No.: US 12,510,181 B2
(45) Date of Patent: Dec. 30, 2025

(54) FLUID CONTROL VALVE AND FLUID CONTROL APPARATUS

(71) Applicant: HORIBA STEC, Co., Ltd., Kyoto (JP)

(72) Inventors: Kazuya Shakudo, Irvine, CA (US); Yuki Hida, Irvine, CA (US); Shigeyuki Hayashi, Irvine, CA (US)

(73) Assignee: HORIBA STEC, Co., Ltd., Kyoto (JP)

( * ) Notice: Subject to any disclaimer, the term of this patent is extended or adjusted under 35 U.S.C. 154(b) by 189 days.

(21) Appl. No.: 18/366,925

(22) Filed: Aug. 8, 2023

(65) Prior Publication Data

US 2024/0060573 A1 Feb. 22, 2024

(30) Foreign Application Priority Data

Aug. 19, 2022 (JP) ................................. 2022-130983
Apr. 20, 2023 (JP) ................................. 2023-069614

(51) Int. Cl.
| | |
|---|---|
| *F16K 31/06* | (2006.01) |
| *F16K 1/36* | (2006.01) |
| *F16K 27/02* | (2006.01) |
| *F16K 37/00* | (2006.01) |

(52) U.S. Cl.
CPC ............ *F16K 31/0655* (2013.01); *F16K 1/36* (2013.01); *F16K 27/029* (2013.01); *F16K 31/0675* (2013.01); *F16K 37/0066* (2013.01)

(58) Field of Classification Search
CPC ...... F16K 1/36; F16K 27/029; F16K 31/0655; F16K 31/0675; F16K 37/0066; F16K 27/0263; G05D 7/0635–0688
USPC ................. 137/468, 486, 487.5; 251/129.08, 251/129.15, 129.06
See application file for complete search history.

(56) References Cited

U.S. PATENT DOCUMENTS

| | | | | |
|---|---|---|---|---|
| 2,325,878 A | * | 8/1943 | Ray ..................... | F16K 31/0658 251/151 |
| 3,921,670 A | * | 11/1975 | Clippard, Jr. ........ | F16K 31/0627 137/625.65 |
| 4,153,072 A | * | 5/1979 | Thompson .............. | F16K 17/10 137/596.1 |
| 4,524,804 A | * | 6/1985 | Goedecke ............ | G05D 7/0635 137/625.65 |

(Continued)

FOREIGN PATENT DOCUMENTS

JP 2011145800 A 7/2011

*Primary Examiner* — Craig J Price
(74) *Attorney, Agent, or Firm* — Alleman Hall & Tuttle LLP (57) ABSTRACT

The present invention enables fluid control with a smaller current or voltage by reducing a magnetic resistance of a magnetic path including the valve body. The present invention includes: a flow path block formed with an internal flow path; an orifice fixed to the flow path block and having a valve seat surface; a valve body having a seating surface seated on the valve seat surface, and made of a magnetic material; and an actuator portion that drives the valve body by a magnetic force. The actuator portion includes: an iron core provided to face a surface of the valve body opposite to the seating surface; a solenoid coil wound around the iron core; and a casing accommodating the iron core and the solenoid coil, and made of a magnetic material. The casing extends to a position surrounding a periphery of the valve body.

14 Claims, 9 Drawing Sheets

(56) References Cited

U.S. PATENT DOCUMENTS

| | | | | |
|---|---|---|---|---|
| 4,664,136 | A * | 5/1987 | Everett | G05D 16/2022 251/129.08 |
| 4,977,916 | A * | 12/1990 | Ohmi | G01F 1/6847 137/8 |
| 5,094,430 | A * | 3/1992 | Shirai | F16K 31/007 251/86 |
| 5,447,173 | A * | 9/1995 | Kazama | G05D 7/0635 251/129.08 |
| 5,490,766 | A * | 2/1996 | Zeck | F04B 9/127 417/63 |
| 5,669,408 | A * | 9/1997 | Nishino | G05D 7/0635 137/486 |
| 5,687,759 | A * | 11/1997 | Tan | G05D 7/005 137/489 |
| 5,730,181 | A * | 3/1998 | Doyle | G05D 7/0635 137/487.5 |
| 5,785,297 | A * | 7/1998 | Ha | F16K 31/0665 251/129.14 |
| 5,988,210 | A * | 11/1999 | Komiya | G01F 1/36 137/486 |
| 6,012,479 | A * | 1/2000 | Fukushima | F16K 27/003 137/271 |
| 6,044,701 | A * | 4/2000 | Doyle | G01F 1/6845 73/202.5 |
| 6,062,246 | A * | 5/2000 | Tanaka | G05D 7/0635 137/12 |
| 6,079,435 | A * | 6/2000 | Franz | G05D 16/2022 251/129.08 |
| 6,178,996 | B1 * | 1/2001 | Suzuki | G05D 7/0635 137/488 |
| 6,220,569 | B1 * | 4/2001 | Kelly | F16K 31/06 251/129.08 |
| 6,313,568 | B1 * | 11/2001 | Sullivan | F16K 31/007 310/346 |
| 6,314,991 | B1 * | 11/2001 | Gill | G05D 7/0635 137/486 |
| 6,543,466 | B2 * | 4/2003 | Gill | G05D 7/0635 137/486 |
| 6,752,377 | B1 * | 6/2004 | Taylor | F16K 1/422 251/363 |
| 6,769,463 | B2 * | 8/2004 | Vu | F16K 27/003 137/884 |
| 7,249,749 | B2 * | 7/2007 | Niwa | F16K 31/0655 335/281 |
| 7,748,683 | B1 * | 7/2010 | Kelly | F16K 31/0655 251/129.08 |
| 8,181,932 | B2 * | 5/2012 | Matsumoto | F16K 31/007 251/61.4 |
| 8,430,378 | B2 * | 4/2013 | Hutchings | F16K 31/0672 137/859 |
| 8,511,337 | B2 * | 8/2013 | Nishimura | F16K 31/0655 251/129.08 |
| 8,561,966 | B2 * | 10/2013 | Dohi | F16K 31/52491 251/263 |
| 8,662,471 | B2 * | 3/2014 | Ohmi | F16K 31/0675 251/129.15 |
| 9,719,599 | B2 * | 8/2017 | Kitano | F16K 27/003 |
| 10,006,564 | B2 * | 6/2018 | Okamura | F16K 1/42 |
| 12,313,180 | B2 * | 5/2025 | Ke | F16K 31/0655 |
| 2003/0178509 | A1 * | 9/2003 | Porter | F02M 51/0653 239/585.1 |
| 2009/0095364 | A1 * | 4/2009 | Itoh | C23C 16/45523 137/861 |

* cited by examiner

PLAN VIEW

FIG. 4A

PERSPECTIVE VIEW

FLUID CONTROL VALVE AND FLUID CONTROL APPARATUS

BACKGROUND OF THE INVENTION

1. Technical Field

The present invention relates to a fluid control valve and a fluid control apparatus.

2. Description of the Related Art

A proportional electromagnetic valve using a solenoid coil has conventionally been used as a fluid control valve, as disclosed in JP 2011-145800 A. In this proportional electromagnetic valve, a movable iron core having a valve body is made of a magnetic material, and a fixed iron core and a coil wound around the fixed iron core are used as an actuator for driving the movable iron core. When the coil is energized, magnetic flux passes through the fixed iron core and the movable iron core, the movable iron core is attracted to the fixed iron core, and a position of the valve body with respect to a valve seat is adjusted.

PRIOR ART DOCUMENT

Patent Document

Patent Document 1: JP 2011-145800 A

SUMMARY OF THE INVENTION

Meanwhile, when a fluid control valve is used in a process gas supply line in a semiconductor manufacturing apparatus, it is desirable to reduce a contact gas area between the fluid control valve and process gas as much as possible. It is therefore conceivable to accommodate an orifice, having a valve seat surface, in a flow path block formed with an internal flow path through which the process gas flows. A length of the flow path leading to the valve seat surface can be shortened by accommodating the orifice in the flow path block, and reduction in the contact gas area can be expected.

In a configuration in which the orifice is accommodated in the flow path block, however, a valve body disposed to face the orifice and an actuator portion that drives the valve body are attached to the flow path block. This configuration is not capable of allowing the magnetic flux generated from the actuator portion to efficiently pass through the valve body, so that magnetic performance becomes deteriorated. As a result, it is necessary to increase a current or a voltage applied to the actuator portion in order to displace the valve body.

Hence, the present invention has been made to solve the problem described above, and a main object thereof is to control fluid with a smaller current or voltage by reducing a magnetic resistance of a magnetic path including a valve body.

That is, a fluid control valve according to the present invention is characterized in that the fluid control valve includes: a flow path block formed with an internal flow path; an orifice accommodated in the flow path block and having a valve seat surface; a valve body having a seating surface seated on the valve seat surface, and made of a magnetic material; and an actuator portion that drives the valve body by a magnetic force, in which the actuator portion includes: an iron core provided to face a surface of the valve body opposite to the seating surface; a solenoid coil wound around the iron core; and a casing accommodating the iron core and the solenoid coil, and made of a magnetic material, and the casing extends to a position surrounding a periphery of the valve body.

According to such a fluid control valve, the orifice having the valve seat surface is accommodated in the flow path block, so that the length of the flow path leading to the valve seat surface can be shortened, and reduction in a contact gas area can thus be expected. In this configuration, the casing accommodating the iron core and the solenoid coil and made of a magnetic material extends to a position surrounding the periphery of the valve body made of a magnetic material, which forms a magnetic path guiding the magnetic flux generated by the solenoid coil to the periphery of the valve body. Therefore, a magnetic resistance of the magnetic path including the valve body is reduced, and the magnetic characteristics can be improved. As a result, fluid can be controlled with a smaller current or voltage.

In a configuration example in which the casing extends to a position surrounding the periphery of the valve body, the surface of the valve body opposite to the seating surface is located closer to the iron core than a distal end surface of the casing closer to the flow path block In addition, the fluid control valve according to the present invention desirably further includes a distance adjustment mechanism that adjusts a distance between the iron core and the valve body.

It is possible to adjust (increase or decrease) a magnetic field (magnetic flux density) to obtain an optimum magnetic field, by adjusting the distance between the iron core and the valve body with the distance adjustment mechanism. As a result, for example, a valve opening degree in a fully-open state can be adjusted. The opening degree of the valve can be set, for example, so as to obtain the fluid adjusted to a desirable full scale (FS) by causing fluid to flow while applying a constant voltage. In addition, for example, when it is desired to control a minute flow rate, the magnetic force for attracting the valve body is weakened by increasing the distance between the iron core and the valve body, so that the minute flow rate can be controlled.

As a specific aspect of the fluid control valve, it is conceivable that the fluid control valve further includes an attachment block attached to the flow path block and accommodating the valve body, and the iron core is fixed to the casing.

With this configuration, the actuator portion can be removed together with the valve body by removing the attachment block with respect to the flow path block, which facilitates disassembly and maintenance. In addition, by attaching the casing to the attachment block, the iron core is provided to face the surface of the valve body opposite to the seating surface.

In this configuration, as a specific aspect of the distance adjustment mechanism, the distance adjustment mechanism is desirably constituted by the casing and the attachment block.

As a specific aspect of the distance adjustment mechanism, it is conceivable that the distance adjustment mechanism includes: a male screw portion formed on one of an outer peripheral surface of the casing or the attachment block; and a female screw portion formed on another of the outer peripheral surface of the casing or the attachment block, and screwed with the male screw portion.

With this configuration, the distance between the iron core and the valve body can be adjusted by a simple operation of rotating the casing with respect to the attachment block.

The attachment block is desirably provided with a fixing portion movable forward and backward with respect to the casing, and fixes the casing to the attachment block.

With this configuration, the distance between the iron core and the valve body can be securely maintained by adjusting the distance between the iron core and the valve body with the distance adjustment mechanism and then fixing the casing with the fixing portion.

As a specific aspect for fixing the casing with the fixing portion, it is desirable that the casing has a cylindrical end portion at a distal end closer to the flow path block, the attachment block has a slit that accommodates the cylindrical end portion, the fixing portion is provided on a side wall portion forming the slit in the attachment block, and the cylindrical end portion is fixed to the side wall portion forming the slit in the attachment block with the fixing portion.

The casing desirably includes: a thin portion located inside the attachment block: and a thick portion located outside the attachment block and having a wall thickness larger than that of the thin portion. In addition, the casing desirably has the thin portion formed with the male screw portion or the female screw portion formed on the outer peripheral surface, and the thick portion formed on a side opposite to the flow path block with respect to the thin portion.

With this configuration, in which the casing has the thick portion, magnetic field lines are less likely to leak to the outside, the magnetic field lines can efficiently pass through the valve body, and the valve body can be easily pulled up. In addition, the thick portion is located outside the attachment block; therefore, the outer diameter of the thin portion can be reduced, which eliminates the need to increase the size of the attachment block. Further, the thick portion operates when the casing rotates with respect to the attachment block, so that rotational torque is reduced and the casing can easily rotate.

In order to absorb dimensional tolerance of each member and fix the solenoid coil, it is desirable that the iron core and the casing are slidably provided with respect to the solenoid coil, and a relative position between the solenoid coil and the valve body is configured so as not to change even when the iron core and the casing are moved by the distance adjustment mechanism.

In order to facilitate disassembly and assembly of the fluid control valve and facilitate maintenance, the flow path block desirably has an accommodating recess that accommodates the orifice.

In order to facilitate assembly of the fluid control valve, the attachment block is desirably attached to the flow path block to fix the orifice accommodated in the accommodating recess.

When a wire material having a large wire diameter is used for a solenoid coil, a resistance value decreases and a current value increases. Therefore, a magnetic force increases while heat is easily generated. When a wire material having a small wire diameter is used for a solenoid coil, the resistance value increases and the current value decreases. Therefore, the magnetic force decreases while heat is hardly generated.

In order to combine these properties and obtain a configuration in which heat is hardly generated while the magnetic force increases, the solenoid coil is desirably configured using a plurality of wire materials having different wire diameters.

As a specific configuration using a plurality of wire materials having different wire diameters, it is desirable that the solenoid coil is divided into a plurality of coil elements along an axial direction of the iron core, and the wire materials of the plurality of coil elements have wire diameters different from each other.

For example, adopting a configuration in which the wire diameter decreases toward the valve body along the axial direction of the iron core enables inhibiting heat generated by the coil on the valve body side, so that a temperature influence of the heat generated by the coil on the fluid, peripheral devices, and the like can be reduced. In addition, when a thermal flow rate sensor is used together with the fluid control valve, it is possible to reduce the temperature influence of the heat generated by the coil on the thermal flow rate sensor.

In addition, adopting a configuration in which the wire diameter increases toward the valve body side along the axial direction of the iron core enables increasing the heat generated by the coil on the valve body side, so that the fluid flowing through the fluid control valve can be heated. When the fluid flowing through the fluid control valve is a gas with a low vapor pressure, for example, liquefaction of the gas can be prevented by the heat generated by the coil, and corrosion of the valve body and the like caused by the liquefaction can be prevented.

The solenoid coil is desirably an air-core coil (also called a bobbin-less coil).

With this configuration, there is no bobbin that serves as a magnetic resistance, so that magnetic flux generated by the solenoid coil can efficiently pass through the valve body.

In order to have the fluid control valve of the present invention function as that of a so-called normally-closed type, it is conceivable that the fluid control valve further includes an elastic body that biases the seating surface toward the valve seat surface, and the actuator portion drives the valve body in a valve opening direction by a magnetic force. In this configuration, the valve body and the elastic body are desirably joined together in order to securely seat the seating surface, when the valve body is not driven, on the valve seat surface. Here, joining includes mechanical joining, weld joining, or adhesive joining.

In addition, a fluid control apparatus according to the present invention is characterized in that the fluid control apparatus includes: a fluid control valve mentioned above; a fluid sensor that measures a flow rate or a pressure of a fluid; a control portion that controls an opening degree of the fluid control valve based on a measured value measured by the fluid sensor and a predetermined target value.

According to the present invention configured as described above, fluid can be controlled with a smaller current or voltage by reducing the magnetic resistance of the magnetic path including the valve body.

DETAILED DESCRIPTION

Hereinafter, an embodiment of a fluid control apparatus using a fluid control valve according to the present invention will be described with reference to the drawings.

It should be noted that any of the drawings referred to below is schematically omitted or exaggerated as appropriate for easy understanding. Same components are denoted by the same reference numerals, and description thereof will be omitted as appropriate.

<Configuration of Apparatus>

A fluid control apparatus 100 of the present embodiment is used in a semiconductor manufacturing process by being incorporated in, for example, a semiconductor manufacturing apparatus. The fluid control apparatus 100 is provided in, for example, one or a plurality of gas supply lines connected to a semiconductor processing chamber to control the flow rate of process gas flowing through each gas supply line.

Figure 1:
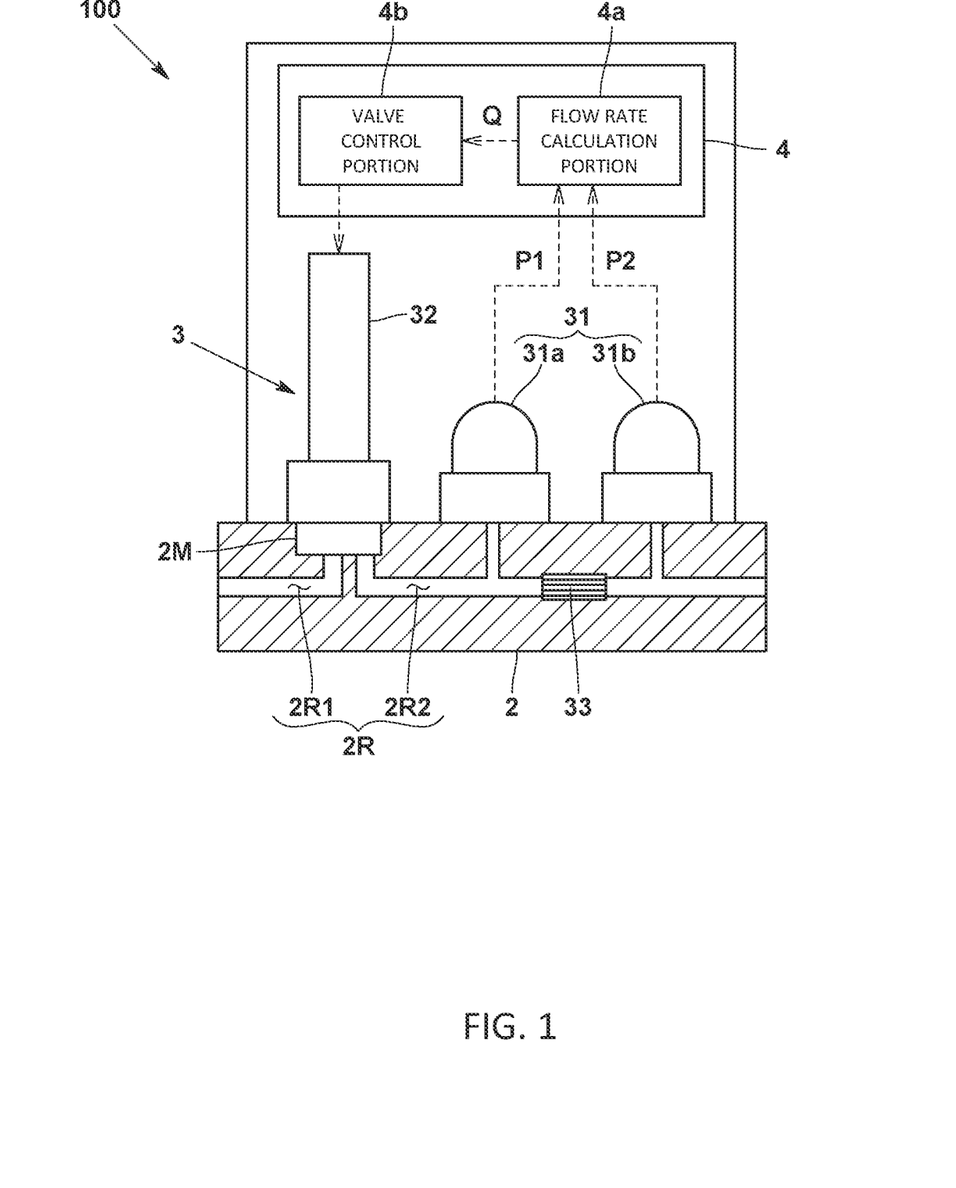
FIG. 1 is a schematic view illustrating a fluid control apparatus according to an embodiment of the present invention.

Specifically, the fluid control apparatus 100 is a so-called differential pressure mass flow controller (a differential pressure MFC). The fluid control apparatus 100 includes, as shown in FIG. 1, a flow path block 2 in which an internal flow path 2R is formed, and a fluid controller 3 including a flow rate sensor 31 and a fluid control valve 32 mounted on the flow path block 2.

The flow path block 2 has a rectangular shape, and is provided with the flow rate sensor 31 and the fluid control valve 32 on a predetermined surface. In addition, a recessed-shaped accommodating recess 2M, for attaching the fluid control valve 32 to the predetermined surface, is formed on the flow path block 2. The concave accommodating recess 2M divides the internal flow path 2R into an upstream flow path 2R1 and a downstream flow path 2R2. In the accommodating recess 2M, one end of the upstream flow path 2R1 is opened in, for example, a bottom surface, and one end of the downstream flow path 2R2 is opened in, for example, the bottom surface.

The fluid controller 3 controls fluid in the internal flow path 2R. The fluid controller 3 includes the flow rate sensor 31 that measures the flow rate of the fluid flowing through the internal flow path 2R, and the fluid control valve 32 provided upstream of the flow rate sensor 31. A valve opening degree of the fluid control valve 32 is feedback-controlled by a control portion 4 to be described later.

The flow rate sensor 31 is a differential pressure flow rate sensor. The flow rate sensor 31 includes an upstream pressure sensor 31a provided upstream of a fluid resistance element 33, such as a restrictor or an orifice provided in the internal flow path 2R, and a downstream pressure sensor 31b provided downstream of the fluid resistance element 33. The upstream pressure sensor 31a and the downstream pressure sensor 31b are attached, in line with the fluid control valve 32, to the predetermined surface of the flow path block 2. A flow rate calculation portion 4a of the control portion 4 to be described later calculates a flow rate Q flowing through the internal flow path 2R, using an upstream pressure P1 of the fluid resistance element 33 detected by the upstream pressure sensor 31a and a downstream pressure P2 of the fluid resistance element 33 detected by the downstream pressure sensor 31b.

The fluid control valve 32 is provided upstream of the differential pressure flow rate sensor 31. Specifically, the fluid control valve 32 is a solenoid valve (an electromagnetic valve) that controls the flow rate by moving the valve body forward and backward with respect to the valve seat with a solenoid. In the present embodiment, the fluid control valve 32 is that of a so-called normally-closed type that is in a fully-closed state when the valve body is not driven. The fluid control valve 32 is controlled by a valve control portion 4b of the control portion 4. The configuration of the fluid control valve 32 will be described later in detail.

The control portion 4 includes a flow rate calculation portion 4a that calculates the flow rate Q flowing through the internal flow path 2R based on the upstream pressure P1 and the downstream pressure P2, and a valve control portion 4b that controls the fluid control valve 32 based on the flow rate Q calculated by the flow rate calculation portion 4a and a target flow rate (a set value). The control portion 4 is a so-called computer including, for example, a CPU, a memory, an A/D and D/A converter, and an input/output unit. The control portion 4 achieves functions as the flow rate calculation portion 4a, a valve control portion 4b, and the like by executing a flow rate control program stored in the memory to cause the various devices cooperate with each other.

<Detailed Configuration of Fluid Control Valve 32>

Figure 2:
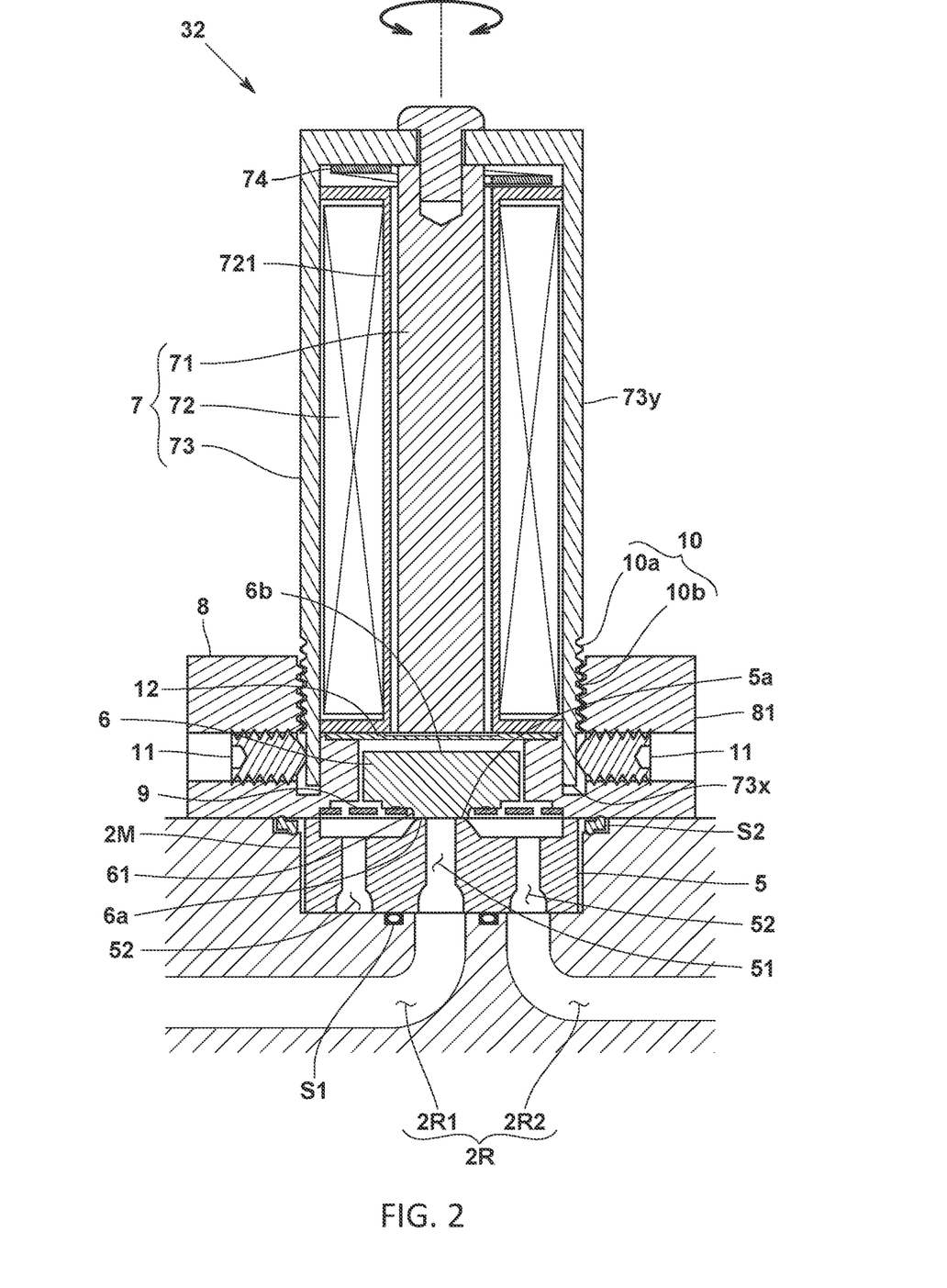
FIG. 2 is a sectional view of a fluid control valve (in a valve-closed state) of the embodiment.
Figure 3:
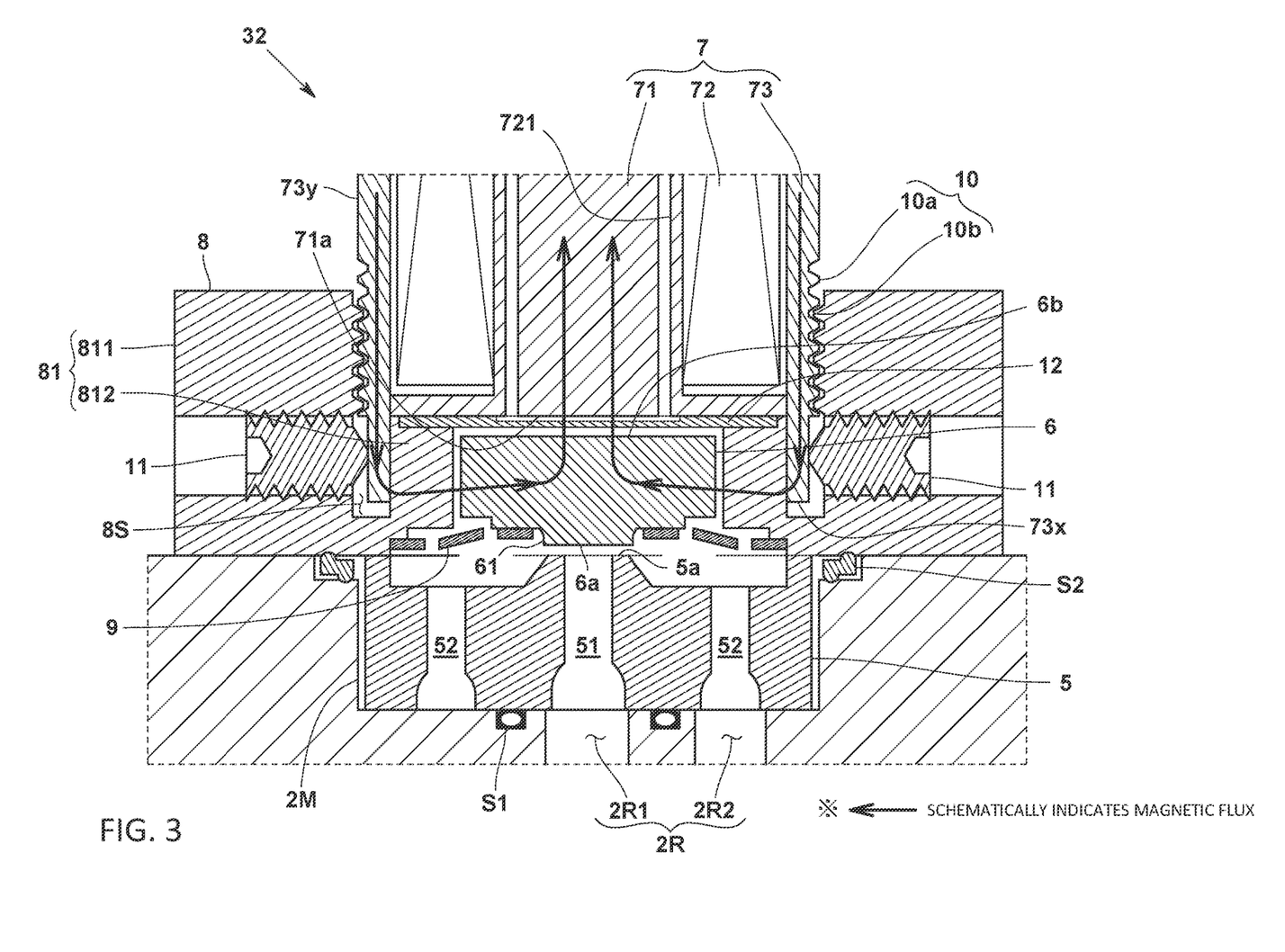
FIG. 3 is a partially enlarged sectional view of the fluid control valve (in a valve-open state) of the embodiment.

As illustrated in FIGS. 2 and 3, the fluid control valve 32 of the present embodiment includes an orifice 5 having a planar valve seat surface 5a, a valve body 6 having a planar seating surface 6a seated in surface contact with the valve seat surface 5a, and an actuator portion 7 that drives the valve body 6 by a magnetic force.

The orifice 5 has a substantially rotating body shape, and is accommodated in the accommodating recess 2M of the flow path block 2, as illustrated in FIGS. 2 and 3. An annular valve seat surface 5a is formed on an upper surface of the orifice 5 facing the opening of the accommodating recess 2M. The orifice 5 is formed of a non-magnetic material such as austenitic stainless steel, for example, SUS316L or the like.

In addition, the orifice 5 is formed with a through hole 51 penetrating from the valve seat surface 5a to a surface opposite to the valve seat surface 5a at an inner central portion of the valve seat surface 5a. This through hole 51 communicates with the upstream flow path 2R1 opened to the bottom surface of the accommodating recess 2M. A seal member 51 such as an O-ring is provided to seal between, in a liquid-tight manner, the periphery of the through hole 51 and the bottom surface of the accommodating recess 2M.

Further, the orifice 5 is formed with a lead-out path 52 through which the fluid flowing into the orifice 5 from the valve seat surface 5a flows out to the downstream flow path 2R2. The lead-out path 52 of the present embodiment is a through hole penetrating from the valve seat surface 5a to the surface opposite to the valve seat surface 5a at the outside of the valve seat surface 5a. This lead-out path 52 communicates with the downstream flow path 2R2 opened to the bottom surface of the accommodating recess 2M.

The valve body 6 has a substantially rotating body shape, and is provided to face the orifice 5 accommodated in the accommodating recess 2M, as illustrated in FIGS. 2 and 3. In addition, the valve body 6 includes a protrusion portion 61 having the planar seating surface 6a on a top surface. The valve body 6 is formed of a magnetic material such as electromagnetic stainless steel, for example, KM45 or the like.

Figure 4A:
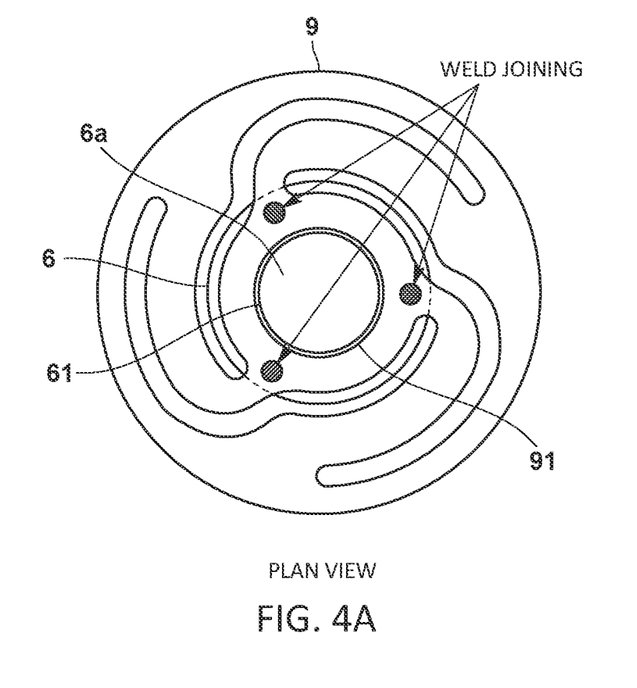
FIGS. 4A and 4B are a plan view and a perspective view of a support member (an elastic body) and a valve body of the embodiment as viewed from a seating surface.
Figure 4B:
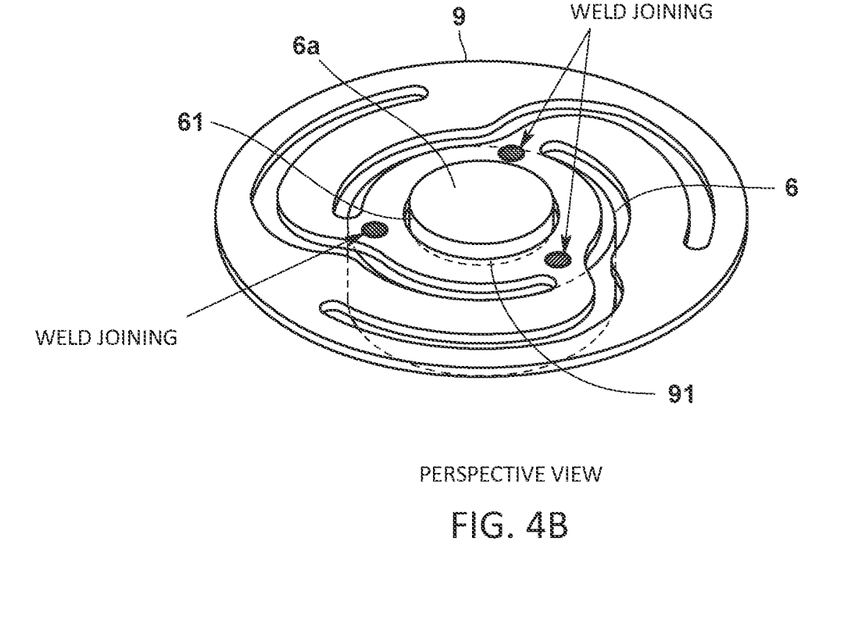

This valve body 6 is accommodated in an attachment block 8 attached to the predetermined surface (an upper surface) of the flow path block 2. The attachment block 8 is formed of a magnetic material such as electromagnetic stainless steel, for example, KM45 or the like. The valve body 6 is supported, with respect to the attachment block 8, by a support member 9 made of an elastic body such as a leaf spring. This support member 9 supports the valve body 6 with the seating surface 6a of the valve body 6 facing the valve seat surface 5a. Specifically, as illustrated in FIGS. 4A and 4B, the support member 9 has an annular shape, and the protrusion portion 61 of the valve body 6 is inserted through a central opening 91 of the support member 9 to support the valve body 6. In addition, the support member 9 and the valve body 6 are integrally formed by weld joining, such as laser welding. Joining for integrally forming the support member 9 and the valve body 6 may be mechanical joining or adhesive jointing. The support member 9 is formed of a non-magnetic material such as austenitic stainless steel, for example, SUS316L or the like. Further, the support member 9 is formed of a material having a spring property, and consideration given to magnetic permeability and having corrosion resistance suitable for a gas-contacting portion of a semiconductor device.

As illustrated in FIG. 3, the valve body 6 is formed with the circular seating surface 6a corresponding to the annular valve seat surface 5a. When a driving force from the actuator portion 7 is not applied to the valve body 6, that is, when the fluid control valve 32 is assembled, the support member 9 is elastically deformed, the seating surface 6a is biased by the support member 9 against the valve seat surface 5a by an elastic force, and the seating surface 6a is seated on the valve seat surface 5a.

In addition, the attachment block 8 is attached to the flow path block 2 to fix the orifice 5 accommodated in the accommodating recess 2M. Specifically, a surface (a lower surface) of the attachment block 8 facing the flow path block 2 comes into contact with the upper surface of the orifice 5, and presses and fixes a lower surface of the orifice 5 toward the bottom surface of the accommodating recess 2M with the seal member 51 interposed between the lower surface of the orifice 5 and the bottom surface of the accommodating recess 2M. A seal member S2 such as a metal ring is provided to seal between, in a liquid-tight manner, the attachment block 8 and the flow path block 2.

As illustrated in FIGS. 2 and 3, the actuator portion 7 includes an iron core 71 provided to face the surface 6b of the valve body 6 opposite to the seating surface 6a, a solenoid coil 72 wound around the iron core 71, and a casing 73 accommodating the iron core 71 and the solenoid coil 72.

The iron core 71 has a substantially cylindrical shape, and one end (an upper end in FIG. 2) of the iron core 71 is connected to the casing 73, and the other end (a lower end in FIG. 2) of the iron core 71 faces the surface 6b of the valve body 6 opposite to the seating surface 6a. The iron core is formed of a magnetic material such as carbon steel for machine structural use, for example, S45C or the like.

The solenoid coil 72 is wound so as to surround an outer peripheral surface of the iron core 71, and specifically, is wound around a bobbin 721 into which the iron core 71 is inserted. Here, the bobbin 721 is slidably provided with respect to the iron core 71. The bobbin 721 is formed of a non-magnetic material such as austenitic stainless steel, for example, SUS316L or the like.

The casing 73 has a cylindrical shape, and an upper wall portion of the casing 73 is connected to an upper end of the iron core 71. In addition, an elastic body such as a wave spring 74 is provided between an upper wall portion of the casing 73 and the solenoid coil 72 (specifically, an upper end of the bobbin 721). The casing 73 is formed of a magnetic material such as carbon steel for machine structural use, for example, S45C or the like. The casing 73 and the iron core 71 may be integrally formed.

In addition, the casing 73 is attached to the attachment block 8, so that the iron core 71 connected to the casing 73 is provided to face the surface 6b of the valve body 6 opposite to the seating surface 6a.

The casing 73 extends to a position surrounding the periphery of the valve body 6, and forms a magnetic path for guiding magnetic flux generated by the solenoid coil 72 to the periphery of the valve body 6. The position surrounding the periphery of the valve body 6 is a position facing an outer peripheral surface of the valve body 6 in a direction perpendicular to a forward and backward direction of the valve body 6. With this configuration, the surface 6b of the valve body 6 opposite to the seating surface 6a (an upper surface of the valve body 6 in FIGS. 2 and 3) is located closer to the iron core 71 (an upper side of the valve body 6) than a distal end surface of the casing 73 closer to the flow path block 2 (a lower surface of the casing 73 in FIGS. 2 and 3). Specifically, the casing 73 extends to a position, around the valve body 6 in a valve-closed state, surrounding at least an upper half of the outer peripheral surface of the valve body 6, for example.

Figure 5:
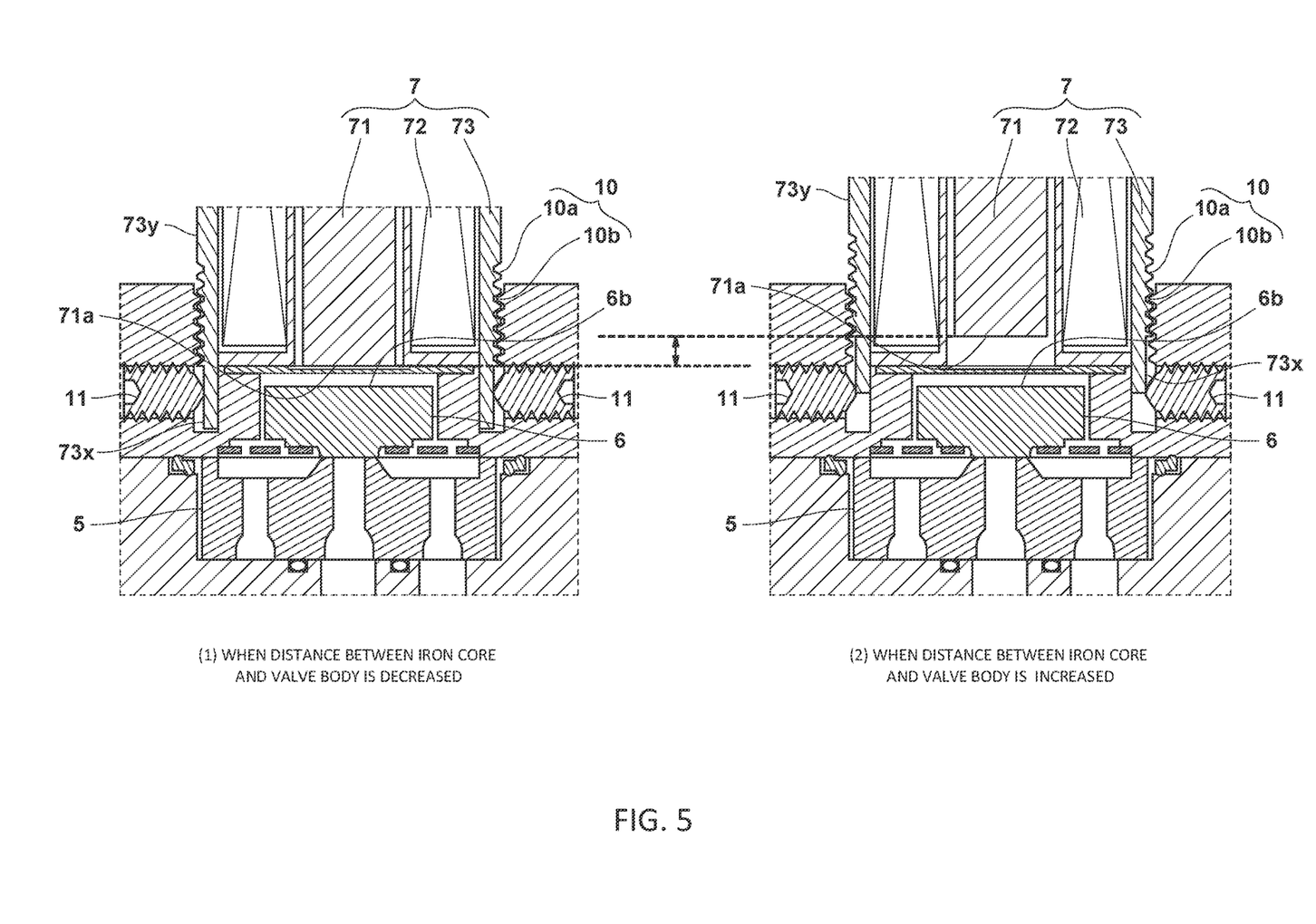
FIG. 5 is a partially enlarged sectional view illustrating states before and after distance adjustment of the embodiment.

In the present embodiment, a distance adjustment mechanism 10 that adjusts the distance between the iron core 71 and the valve body 6 is provided, as illustrated in FIGS. 2, 3, and 5.

The distance adjustment mechanism 10 adjusts the distance between the facing surfaces of the iron core 71 and the valve body 6. The distance adjustment mechanism 10 is interposed between the casing 73 and the attachment block 8, and is constituted by the casing 73 and the attachment block 8. Here, the facing surfaces of the iron core 71 and the valve body 6 are respectively a lower end surface 71a of the iron core 71 and the surface 6b of the valve body 6 opposite to the seating surface 6a.

Specifically, the distance adjustment mechanism 10 includes a male screw portion 10a formed on an outer peripheral surface of the casing 73 and a female screw portion 10b formed in the attachment block 8 and to which the male screw portion 10a is screwed. With this configuration, the casing 73 is attached to the attachment block 8 by screwing the male screw portion 10a and the female screw portion 10b together. In addition, by rotating the casing 73 with respect to the attachment block 8, the casing 73 moves forward and backward in an axial direction with respect to the attachment block 8, as illustrated in FIG. 5, and the distance between the facing surfaces of the iron core 71 and the valve body 6 are adjusted.

Here, as illustrated in FIGS. 2, 3, and 5, the attachment block 8 is provided with a retaining screw 11 in the side wall portion 81 in which the female screw portion 10b is formed. The retaining screw 11 is a fixing portion movable forward and backward with respect to the casing 73, and fixes the casing 73 to the attachment block 8. This retaining screw 11 is movable forward and backward in a direction perpendicular to a direction in which the casing 73 is moved by the distance adjustment mechanism 10.

Specifically, as illustrated in FIGS. 2, 3, and 5, the casing 73 includes a cylindrical end portion 73x at a distal end closer to the flow path block than the male screw portion 10a. The retaining screw 11 comes into pressing contact with a cylindrical end portion 73x to fix the casing 73 to the attachment block 8. The cylindrical end portion 73x of the present embodiment has the same diameter as that of an accommodating main body portion 73y accommodating the solenoid coil 72 in the casing 73. That is, the casing 73 is configured without a flange portion for attachment to the attachment block 8.

More specifically, as shown in FIG. 3, the attachment block 8 has an annular slit 8S that accommodates the cylindrical end portion 73x, and the retaining screw 11 is provided in the radially-outer side wall portion 811 that forms the slit 8S. In addition, a radially-inner side wall portion 812 that forms the slit 8S is provided so as to surround the outer peripheral surface of the valve body 6. The cylindrical end portion 73x is pressed and fixed, by the retaining screw 11, to the radially-inner side wall portion 812 that forms the slit 8S. With this configuration, the magnetic flux that reaches the cylindrical end portion 73x of the casing 73 flows to the valve body 6 through the radially-inner side wall portion 812.

The present embodiment is configured so that even when the casing 73 and the iron core 71 are moved with respect to the attachment block 8 by the distance adjustment mechanism 10, a relative position between the solenoid coil 72 and the attachment block 8 (the valve body 6) does not change (see FIG. 5). Specifically, the solenoid coil 72 is slidably provided with respect to the iron core 71 and the casing 73. In addition, the solenoid coil 72 is configured to be pressed by the wave spring 74 provided between the upper wall portion of the casing 73 and the solenoid coil 72 (the upper end of the bobbin 721) toward the attachment block 8. This wave spring 74 absorbs dimensional tolerance and fixes the solenoid coil 72. A configuration without the wave spring 74 may be adopted as long as dimensional accuracy of each member is achieved.

As illustrated in FIG. 3, a diaphragm seal 12 is provided between the lower end surface of the bobbin 721 and an upper end surface of the attachment block 8 to liquid-tightly seal between the lower end surface of the bobbin 721 and the upper end surface of the attachment block 8. The diaphragm seal 12 is formed of a non-magnetic material such as austenitic stainless steel, for example, SUS316L or the like.

Operation of the fluid control valve 32 of the present embodiment will be briefly described next.

In a fully-closed state where no current flows through the solenoid coil 72 of the actuator portion 7, the valve body 6 is biased toward the orifice 5 by the elastic force of the support member 9, and the seating surface 6a of the valve body 6 is in pressing contact with the valve seat surface 5a of the orifice 5.

When a current flows through the solenoid coil 72, magnetic flux is generated by the solenoid coil 72, and the magnetic flux flows through the iron core 71 and the casing 73 to the valve body 6. As a result, the valve body 6 is attracted to the iron core 71, and the seating surface 6a of the valve body 6 is separated from the valve seat surface 5a of the orifice 5 to enter a valve-open state. The valve opening degree of the fluid control valve 32 is adjusted by controlling the current applied to the solenoid coil 72. Here, the cylindrical end portion 73x of the casing 73 extends to a position surrounding the valve body 6, and magnetic flux flows from the cylindrical end portion 73x of the casing 73 to the valve body 6 through the radially-inner side wall portion 812 of the slit 8S. As a result, a magnetic resistance of the magnetic path including the valve body 6 is reduced, which improves magnetic characteristics.

Effects of Present Embodiment

According to the fluid control apparatus 100 of the present embodiment with the foregoing configuration, the orifice 5 including the valve seat surface 5a is accommodated in the flow path block 2, so that a length of the flow path leading to the valve seat surface 5a can be shortened, and reduction in a contact gas area can thus be expected. In this configuration, the casing 73 accommodating the iron core 71 and the solenoid coil 72 and made of a magnetic material extends to a position surrounding the periphery of the valve body 6 made of a magnetic material, and forms the magnetic path guiding the magnetic flux generated by the solenoid coil 72 to the periphery of the valve body 6. Therefore, the magnetic resistance of the magnetic path including the valve body 6 is reduced, and the magnetic characteristics can be improved. As a result, fluid can be controlled with a smaller current or voltage.

In addition, in the present embodiment, the magnetic resistance of the magnetic path including the valve body 6 is reduced, and the magnetic characteristics can be improved. Therefore, it is possible to increase an attraction force to the iron core 71 when the solenoid coil 72 is energized. As a result, the elastic force (a spring constant) of the support member 9 that brings the seating surface 6a into pressing contact with the valve seat surface 5a can be increased, and seat leakage (liquid leakage) in the fully-closed state can be inhibited.

Further, the present embodiment includes the distance adjustment mechanism 10 that adjusts the distance between the iron core 71 and the valve body 6. It is therefore possible to adjust (increase or decrease) a magnetic field (magnetic flux density) to obtain an optimum magnetic field, by adjusting the distance between the iron core 71 and the valve body 6 with the distance adjustment mechanism 10. As a result, for example, a valve opening degree in a fully-open state can be adjusted. The opening degree of the valve can be set, for example, so as to obtain the fluid adjusted to a desirable full scale (FS) by causing fluid to flow while applying a constant voltage. In addition, for example, when it is desired to control a minute flow rate, the magnetic force for attracting the valve body 6 is weakened by increasing the distance between the iron core 71 and the valve body 6, so that the minute flow rate can be controlled.

Other Embodiments

Figure 6:
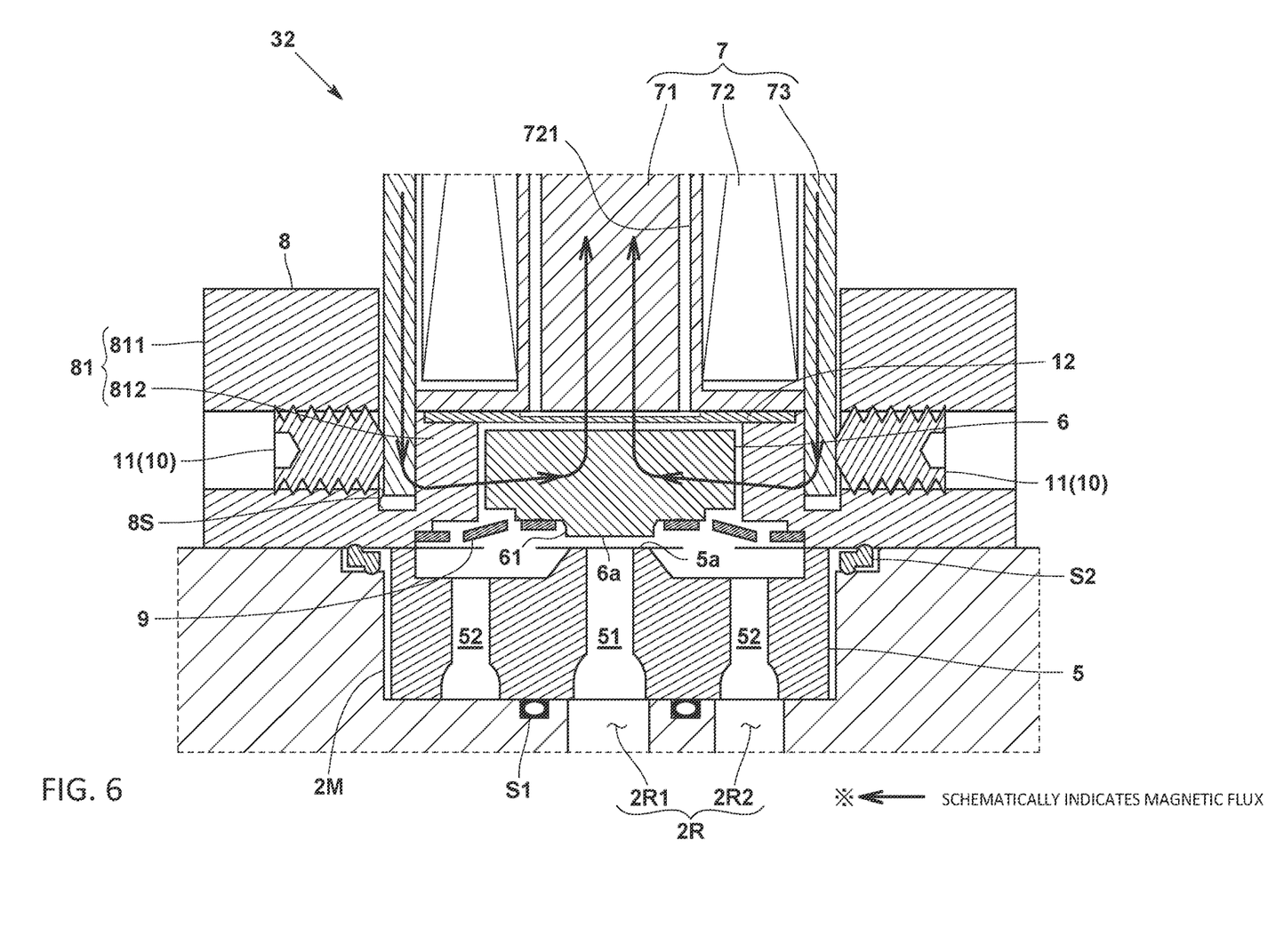
FIG. 6 is a partially enlarged sectional view of a fluid control valve (in a valve-open state) of a modification of the embodiment.

For example, the distance adjustment mechanism 10 of the embodiment is constituted by the male screw portion 10a and the female screw portion 10b; however, the distance adjustment mechanism 10 may be constituted by a retaining screw 11 as illustrated in FIG. 6. In this case, it is conceivable that the distance adjustment mechanism 10 is configured such that an annular slit 8S for accommodating the cylindrical end portion 73x is formed in the attachment block 8, and fixed with the retaining screw 11 after the cylindrical end portion 73x is vertically adjusted in the slit 8S.

Alternatively, the male screw portion 10a and the female screw portion 10b of the distance adjustment mechanism 10 of the embodiment may be configured in a reverse manner. That is, the male screw portion 10a may be formed in the attachment block 8 and the female screw portion 10*b* may be formed on the inner peripheral surface of the casing.

Figure 7:
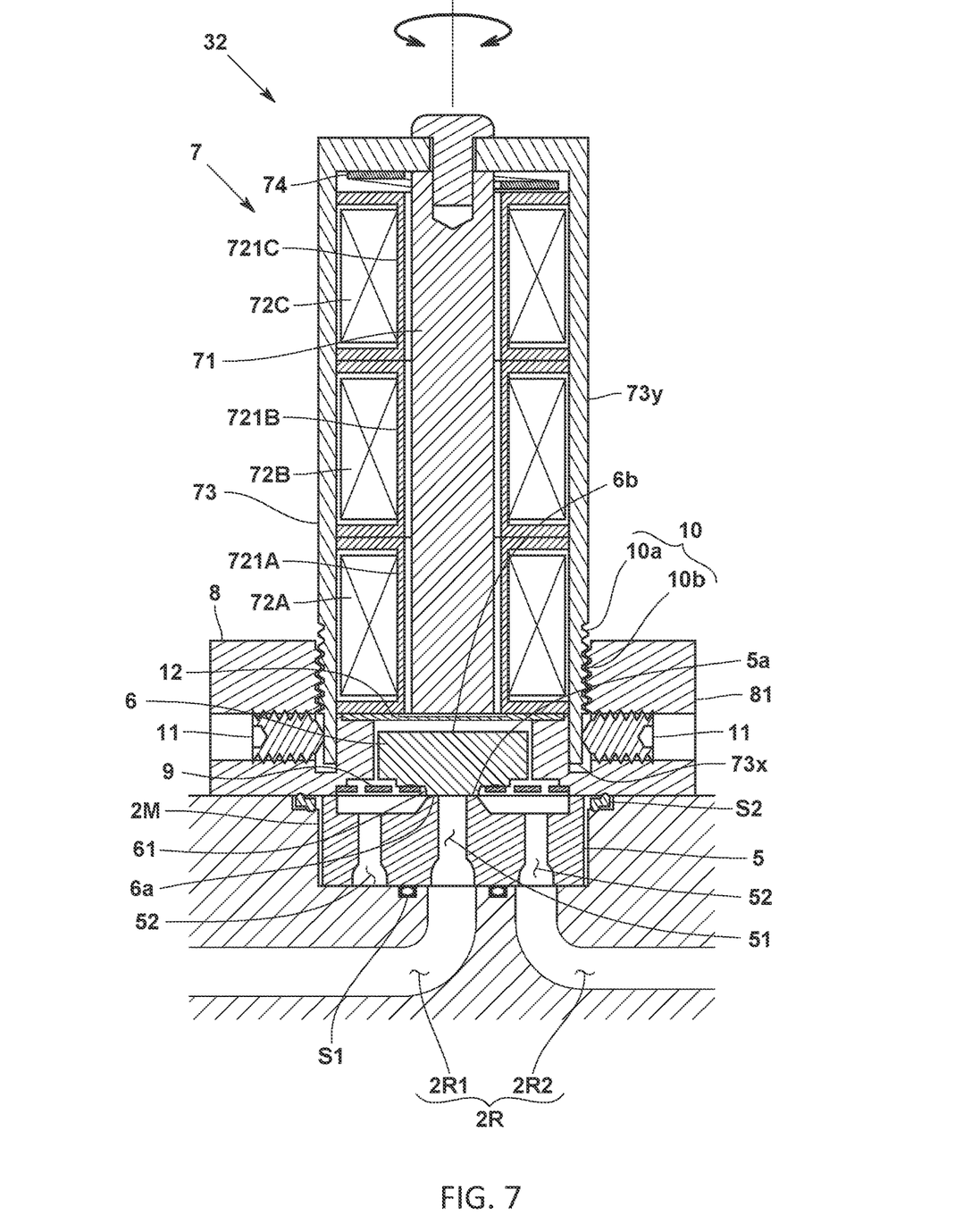
FIG. 7 is a sectional view of a fluid control valve (in a valve-closed state) of a modification of the embodiment.

Further alternatively, as illustrated in FIG. 7, the solenoid coil 72 may be configured using a plurality of wire materials having different wire diameters. Specifically, the solenoid coil 72 is divided into a plurality of coil elements 72A to 72C along an axial direction of the iron core 71. In FIG. 7, the solenoid coil 72 is divided into three coil elements; however, the solenoid coil 72 may be divided into two coil elements or may be divided into four or more coil elements. Each of the coil elements 72A to 72C is respectively wound around bobbins 721A to 721C.

The wire materials of the plurality of coil elements 72A to 72C have wire diameters different from each other. In FIG. 7, an inner diameter and an outer diameter of each of the coil elements 72A to 72C are substantially equal, and the coil elements 72A to 72C are configured such that the larger the wire diameter, the smaller the number of turns.

Adopting a configuration in which the wire diameter decreases toward the valve body 6 along the axial direction of the iron core 71 enables inhibiting the heat generated by the solenoid coil 72 at the valve body 6 side (the coil element 72A), so that a temperature influence of the heat generated by the coil element 72A on the fluid can be reduced. In addition, when a thermal flow rate sensor is used together with the fluid control valve 32, it is possible to reduce the temperature influence of the heat generated by the coil element 72A on the thermal flow rate sensor.

Alternatively, adopting a configuration in which the wire diameter increases toward the valve body 6 along the axial direction of the iron core 71 enables increasing the heat generated by the solenoid coil 72 at the valve body 6 side (the coil element 72A), so that the fluid flowing through the fluid control valve 32 can be heated. When the fluid flowing through the fluid control valve 32 is a gas with low vapor pressure, for example, liquefaction of the gas can be prevented by the heat generated by the coil element 72A, and corrosion of the valve body 6 and the like due to liquefaction can be prevented. The solenoid coil 72 may adopt a configuration, in addition to the solenoid coil 72 being divided along the axial direction of the iron core 71, in which the solenoid coil is divided along a radial direction of the iron core 71 (a configuration having a radially-inner coil element and a radially-outer coil element).

Figure 8:
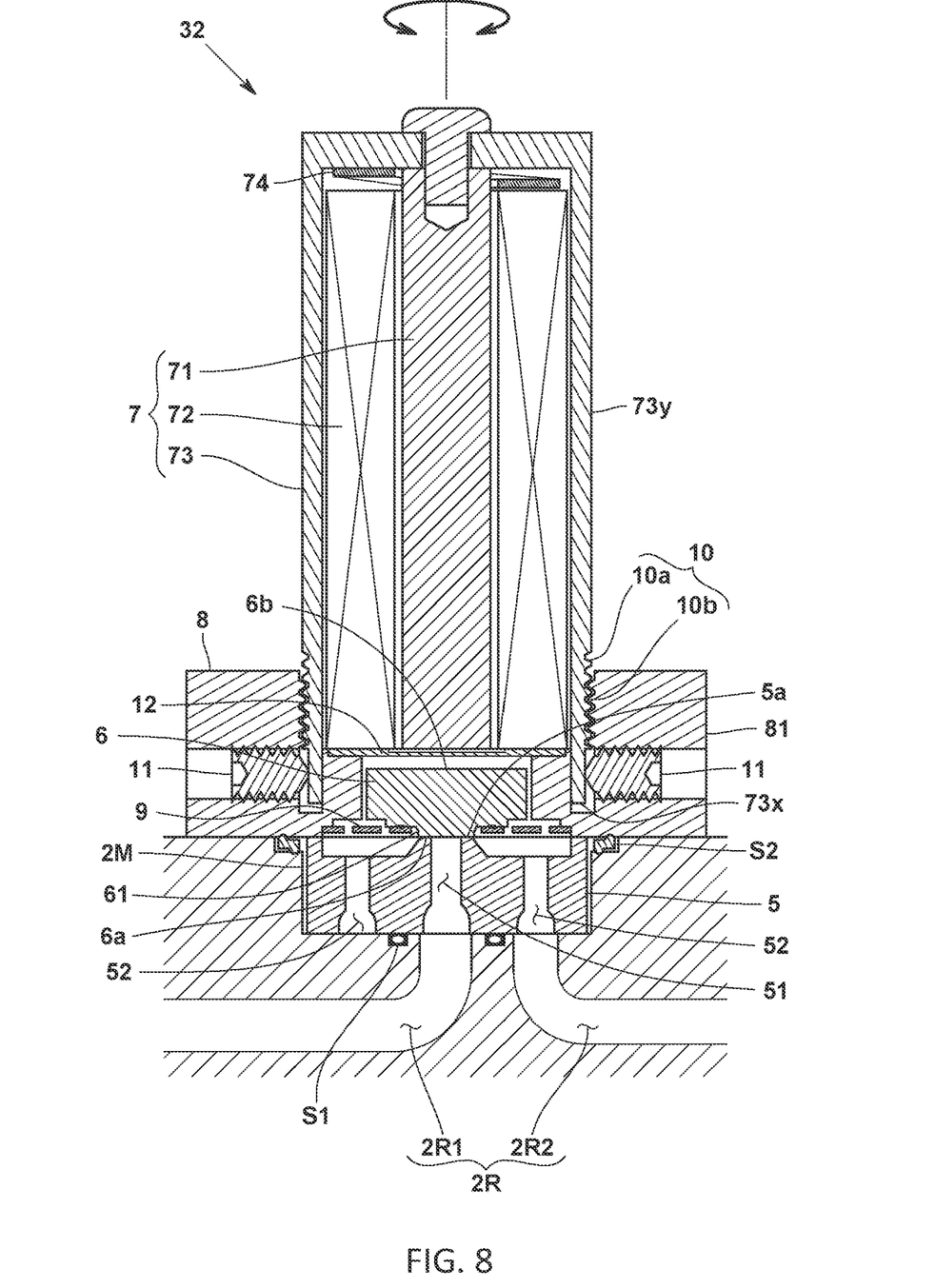
FIG. 8 is a sectional view of a fluid control valve (in a valve-closed state) of a modification of the embodiment.

Alternatively, as illustrated in FIG. 8, the solenoid coil 72 may be an air-core coil (also called a bobbin-less coil) without the bobbin 721. With this configuration, there is no bobbin 721 serving as the magnetic resistance, so that magnetic flux generated by the solenoid coil 72 can efficiently pass through the valve body 6.

Figure 9:
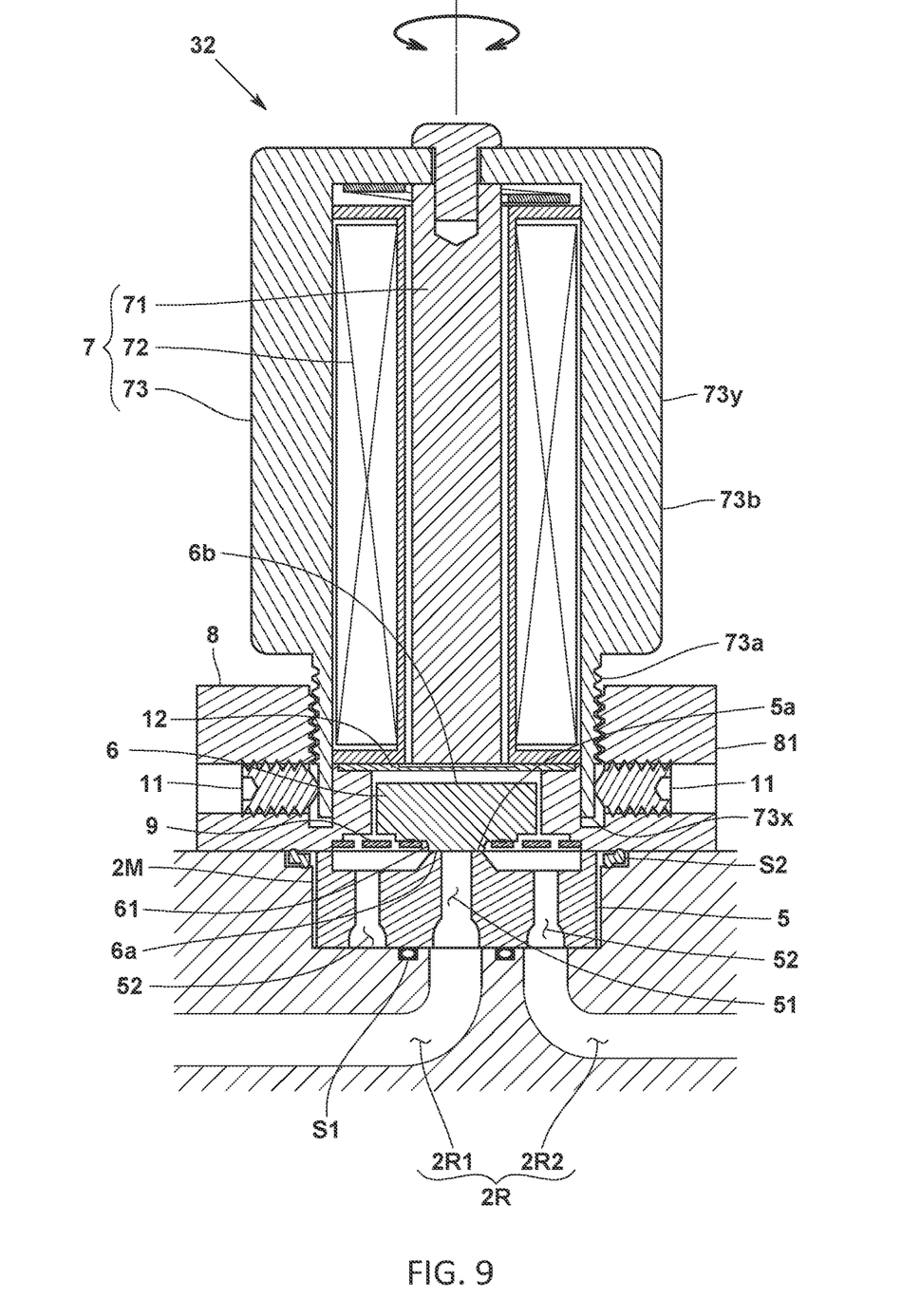
FIG. 9 is a sectional view of a fluid control valve (in a valve-closed state) of a modification of the embodiment.

Further alternatively, as shown in FIG. 9, the casing 73 may have a thin portion 73*a* located inside the attachment block 8, and a thick portion 73*b* located outside the attachment block 8 and having a wall thickness larger than that of the thin portion 73*a*.

Here, the thin portion 73*a* has a male screw portion 10*a* formed on the outer peripheral surface, and the thick portion 73*b* is formed on a side opposite to the flow path block 2 with respect to the thin portion 73*a*. The thin portion 73*a* and the thick portion 73*b* are constituted by an accommodating main body portion 73*y*. In addition, in FIG. 9, the inner peripheral surface of the thin portion 73*a* and the inner peripheral surface of the thick portion 73*b* are continuous without a step; however, a step may be provided between the inner peripheral surface of the thin portion 73*a* and the inner peripheral surface of the thick portion 73*b*. Further, the thick portion 73*b* has an equal cross-sectional shape along the axial direction of the iron core 71; however, the thick portion 73*b* does not necessarily have the equal cross-sectional shape along the axial direction.

With this configuration, in which the casing 73 has the thick portion 73*b*, magnetic field lines are less likely to leak to the outside, the magnetic field lines can efficiently pass through the valve body 6, and the valve body 6 can be easily pulled up. In addition, the thick portion 73*b* is formed on the side opposite to the flow path block 2 with respect to the thin portion 73*a* on which the male screw portion 10*a* is formed; therefore, an outer diameter of the thin portion 73*a* can be reduced, which eliminates the need to increase the size of the attachment block 8. In addition, the thick portion 73*b* operates when the casing 73 rotates with respect to the attachment block 8, so that rotational torque is reduced and the casing 73 can easily rotate.

Further, the fluid control valve 32 of the embodiment may be that of, in addition to a normally-closed type, a so-called normally-open type that is in a fully-open state when the valve body 6 is not driven. In the normally-closed type, when a current flows through the solenoid coil 72, magnetic flux generated by the solenoid coil 72 flows through the iron core 71 and the casing 73 to the valve body 6. As a result, the valve body 6 is attracted to the iron core 71, and the seating surface 6*a* of the valve body 6 is separated from the valve seat surface 5*a* of the orifice 5 to enter the valve-open state. It is also conceivable, however, to change the configuration to that of a normally-open type fluid control valve, by balancing between a support force of the support member 9 supporting the valve body 6 and the magnetic force of the magnetic material of the valve body 6.

In addition, in the embodiment described above, the fluid control valve 32 is provided upstream of the flow rate sensor 31; however, the fluid control valve 32 may be provided downstream of the flow rate sensor 31.

In addition, in the embodiment described above, a pressure flow rate sensor is used as the flow rate sensor 31 of the fluid control apparatus 100; however, a thermal flow rate sensor may be used. In this case, it is conceivable that the thermal flow rate sensor is disposed upstream of the fluid control valve 32. In addition to the flow rate sensor, a fluid sensor such as a pressure sensor may be used.

In addition, the fluid control apparatus 100 is not limited to the pressure type and the thermal type. Alternatively, the fluid control apparatus 100 may be provided with, in the fluid control valve 32, a position sensor that measures a relative position between the valve seat surface 5*a* and the seating surface 6*a*, and the valve opening degree may be feedback-controlled based on a measured value of the position sensor. In addition, the fluid control apparatus of the present invention is not limited to the fluid control apparatus of the embodiment. The fluid control apparatus can also be applied to a pressure control apparatus that controls fluid pressure.

Furthermore, various modifications and combinations of the embodiments may be made without departing from the gist according to the present invention.

DESCRIPTION OF REFERENCE CHARACTERS

100: fluid control apparatus
2: flow path block
2R: internal flow path
2M: accommodating recess
32: fluid control valve
31: fluid sensor
4: valve control portion 5: orifice
5a: valve seat surface
6: valve body
6a: seating surface
7: actuator portion
71: iron core
72: solenoid coil
72A: coil element
72B: coil element
72C: coil element
73: casing
73x: cylindrical end portion
73a: thin portion
73b: thick portion
8: attachment block
8S: annular slit
811: radially-outer side wall portion
812: radially-inner side wall portion
10: distance adjustment mechanism
10a: male screw portion
10b: female screw portion
11: retaining screw

What is claimed is:

1. A fluid control valve comprising:
a flow path block formed with an internal flow path;
an orifice accommodated in the flow path block and having a valve seat surface;
a valve body having a seating surface seated on the valve seat surface, and made of a magnetic material; and
an actuator portion that drives the valve body by a magnetic force,
wherein the actuator portion includes:
an iron core provided to face a surface of the valve body opposite to the seating surface;
a solenoid coil wound around the iron core; and
a casing accommodating the iron core and the solenoid coil, and made of a magnetic material, and
the casing extends to a position surrounding a periphery of the valve body,
a distance adjustment mechanism that adjusts a distance between the iron core and the valve body; and
an attachment block attached to the flow path block and accommodating the valve body,
wherein the iron core is fixed to the casing, and
the distance adjustment mechanism is constituted by the casing and the attachment block.

2. The fluid control valve according to claim 1, wherein the surface of the valve body opposite to the seating surface is located closer to the iron core than a distal end surface of the casing closer to the flow path block.

3. The fluid control valve according to claim 1, wherein the distance adjustment mechanism includes:
a male screw portion formed on one of an outer peripheral surface of the casing or the attachment block; and
a female screw portion formed on another of the outer peripheral surface of the casing or the attachment block, and screwed with the male screw portion.

4. The fluid control valve according to claim 3, wherein the attachment block is provided with a fixing portion movable forward and backward with respect to the casing, and fixes the casing to the attachment block.

5. The fluid control valve according to claim 4, wherein the casing has a cylindrical end portion at a distal end closer to the flow path block,
the attachment block has a slit that accommodates the cylindrical end portion,
the fixing portion is provided on a side wall portion forming the slit in the attachment block, and
the cylindrical end portion is fixed to the side wall portion forming the slit in the attachment block with the fixing portion.

6. The fluid control valve according to claim 3, wherein the casing includes: a thin portion located inside the attachment block, and a thick portion located outside the attachment block and having a wall thickness larger than that of the thin portion.

7. The fluid control valve according to claim 1, wherein the flow path block has an accommodating recess that accommodates the orifice.

8. The fluid control valve according to claim 7, wherein the attachment block is attached to the flow path block to fix the orifice accommodated in the accommodating recess.

9. The fluid control valve according to claim 1, wherein the solenoid coil is configured using a plurality of wire materials having different wire diameters.

10. The fluid control valve according to claim 1, wherein the solenoid coil is divided into a plurality of coil elements along an axial direction of the iron core, and wire materials of the plurality of coil elements have wire diameters different from each other.

11. The fluid control valve according to claim 1, wherein the solenoid coil is an air-core coil.

12. The fluid control valve according to claim 1, further comprising an elastic body that biases the seating surface toward the valve seat surface,
wherein the actuator portion drives the valve body in a valve opening direction by the magnetic force, and
the valve body and the elastic body are joined together.

13. A fluid control apparatus comprising:
the fluid control valve according to claim 1;
a fluid sensor that measures a flow rate or a pressure of a fluid; and
a control portion that controls an opening degree of the fluid control valve based on a measured value measured by the fluid sensor and a predetermined target value.

14. A fluid control valve, comprising:
a flow path block formed with an internal flow path;
an orifice accommodated in the flow path block and having a valve seat surface;
a valve body having a seating surface seated on the valve seat surface, and made of a magnetic material; and
an actuator portion that drives the valve body by a magnetic force,
wherein the actuator portion includes:
an iron core provided to face a surface of the valve body opposite to the seating surface;
a solenoid coil wound around the iron core; and
a casing accommodating the iron core and the solenoid coil, and made of a magnetic material, and
the casing extends to a position surrounding a periphery of the valve body; and
a distance adjustment mechanism that adjusts a distance between the iron core and the valve body,
wherein the iron core and the casing are slidably provided with respect to the solenoid coil, and
a relative position between the solenoid coil and the valve body is configured so as not to change even when the iron core and the casing are moved by the distance adjustment mechanism.

* * * * *